US006358146B1

(12) United States Patent
Adams

(10) Patent No.: US 6,358,146 B1
(45) Date of Patent: *Mar. 19, 2002

(54) METHOD OF PLAYING GAME AND GAMING DEVICE COMPRISING A PRIMARY GAMING UNIT AND A PINBALL-TYPE GAME

(75) Inventor: William R. Adams, Las Vegas, NV (US)

(73) Assignee: Anchor Gaming, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 09/270,330

(22) Filed: Mar. 16, 1999

Related U.S. Application Data

(63) Continuation-in-part of application No. 08/722,379, filed on Sep. 30, 1996, now Pat. No. 5,882,261.

(51) Int. Cl.[7] .................................................. A63F 13/00

(52) U.S. Cl. ........................ 463/20; 463/46; 273/143 R

(58) Field of Search ........................ 273/143 R; 463/20, 463/42, 16, 46

(56) References Cited

U.S. PATENT DOCUMENTS

| | | | |
|---|---|---|---|
| 3,281,149 | A | 10/1966 | Miller |
| 4,700,948 | A | 10/1987 | Okada |
| 4,805,907 | A | 2/1989 | Hagiwara |
| 4,840,375 | A | 6/1989 | Lawlor et al. |
| 4,871,171 | A | 10/1989 | Rivero |
| 4,906,005 | A | 3/1990 | Manabe |
| 5,167,413 | A | 12/1992 | Fulton |

(List continued on next page.)

FOREIGN PATENT DOCUMENTS

| | | | | |
|---|---|---|---|---|
| DE | 2938307 | | 4/1981 | |
| DE | 3700861 | | 7/1988 | |
| DE | 4014477 | | 7/1991 | |
| EP | 0333338 | | 9/1989 | |
| FR | 1474617 | | 3/1967 | |
| GB | 1242298 | | 8/1971 | |
| GB | 2066991 | * | 7/1981 | ............. 273/143 R |
| GB | 2072395 | | 9/1981 | |
| GB | 2083936 | | 3/1982 | |
| GB | 2084371 | | 4/1982 | |
| GB | 2096376 | | 10/1982 | |
| GB | 2153572 | | 8/1985 | |
| GB | 2170938 | | 8/1986 | |
| GB | 2182186 | | 5/1987 | |
| GB | 2191030 | | 12/1987 | |
| GB | 2201821 | * | 9/1988 | ............. 273/143 R |
| GB | 2202984 | | 10/1988 | |
| GB | 2242300 | | 9/1991 | |
| GB | 2273384 | * | 6/1994 | ............. 273/143 R |
| JP | 5131044 | | 5/1993 | |

OTHER PUBLICATIONS

Bueschel, Richard M., "An Illustrated Price Guide to the 100 Most Collectible Trade Stimulators," 1978, pp. 21, 29, 83.

Bueschel, Richard M., "Slots 1," 1978, pp. 136, 142.

Geddes, Robert N., "Slot Machines on Parade," Oct. 1980, p. 128.

Advertisement, Bally Distributing Company, Double or Nothing, Model 1083, Ch. 11, 1975–1984, p. 267.

Fey, Marshall, "Slot Machines," 1983, p. 126, 150.

Intergame Magazine, Jun. 1995, cover and pp. 91, 101.

English Translation of French Patent No. 1474617.

English Translation of Japanese Patent No. 5131044.

*Primary Examiner*—Benjamin H. Layno
(74) *Attorney, Agent, or Firm*—TraskBritt

(57) ABSTRACT

Methods of playing games and gaming devices useful with playing games comprise a gaming unit, e.g., three reels, and a vertically disposed pinball-type game.

42 Claims, 5 Drawing Sheets

U.S. PATENT DOCUMENTS

| | | | | | |
|---|---|---|---|---|---|
| 5,205,555 | A | | 4/1993 | Hamano | |
| 5,259,616 | A | | 11/1993 | Bergmann | |
| 5,342,049 | A | * | 8/1994 | Wichinsky et al. | 273/138.2 |
| 5,344,145 | A | | 9/1994 | Chadwick et al. | |
| 5,486,005 | A | | 1/1996 | Neal | |
| 5,628,684 | A | | 5/1997 | Bouedec | |
| 5,695,402 | A | | 12/1997 | Stupak | |
| 5,707,285 | A | | 1/1998 | Place et al. | |
| 5,722,891 | A | | 3/1998 | Inoue | |
| 5,772,509 | A | | 6/1998 | Weiss | |
| 5,823,874 | A | | 10/1998 | Adams | |
| 5,848,932 | A | | 12/1998 | Adams | |
| 5,882,261 | A | | 3/1999 | Adams | |
| 5,911,418 | A | | 6/1999 | Adams | |
| 6,089,978 | A | | 7/2000 | Adams | |
| 6,110,043 | A | * | 8/2000 | Olsen | 462/22 |

* cited by examiner

METHOD OF PLAYING GAME AND GAMING DEVICE COMPRISING A PRIMARY GAMING UNIT AND A PINBALL-TYPE GAME

RELATED APPLICATION

This is a continuation-in-part of application Ser. No. 08/722,379 filed on Sep. 30, 1996 which issued as U.S. Pat. No. 5,882,261 on Mar. 16, 1999.

The present invention is directed to methods of playing wagering games and gaming devices comprising a primary gaming unit and a pinball-type game.

BACKGROUND OF THE INVENTION

Games of chance have been enjoyed by people for thousands of years and have enjoyed widespread popularity in recent times. Many people enjoy playing a wide variety of games that they have not previously played. Playing new games adds to the excitement of this recreational activity particularly when some form of "gaming" is involved. As used herein, the term "gaming" and "gaming devices" are used to indicate that some form of wagering is involved, and that players must make wagers of value, whether actual currency or some equivalent of value, e.g., token or credit.

One popular game of chance that has long been enjoyed by many players is the slot machine. Conventionally, a slot machine is configured for a player to input something of value, e.g., a standard denomination of currency or house token or other representation of currency or credit, and then to permit the player to activate the device which causes a plurality of reels to spin and ultimately stop to display a random combination of some form of indicia, for example, numbers or symbols. If this display contains one of a preselected plurality of winning combinations, the machine releases money into a payout chute or onto a credit meter for the player. For example, if a player initially wagered two coins of a national currency and that player won a high payout, that player may receive fifty coins of the same denomination in return.

Since it is desirable to offer players games which they have not played before, it would be desirable to provide a player with new games and additional opportunities to receive winning payouts. It would be particularly desirable to provide new methods of determining the amounts of such winning payouts.

It would therefore also be desirable to provide novel payouts and events which are discernible by a player and/or other observers.

SUMMARY OF THE INVENTION

Various embodiments of the present invention comprise gaming devices having a gaming unit and a pinball-type game.

According to one embodiment of the present invention, a pinball-type game provides at least one payout solely on the basis of the outcome of the pinball-type game. In one embodiment, the pinball-type game is clearly visible to a player and is actuated when the primary gaming unit comprising a slot machine displays certain predetermined indicia. In another embodiment, the pinball-type game is actuated by some event other than the outcome of the gaming unit such as the wagering of some minimum pre-determined amount, e.g., maximum number of coins permitted for playing the primary gaming unit, a pre-determined rate of play by a player, the use of a player tracking device by a player, e.g. a casino card, or some signal generated by the gaming establishment, or a choice by the player after a pre-determined event, e.g. a player may be provided the option of receiving an award or playing the pinball-type game or waging a portion of the award on the pinball-type game. The pinball-type game is preferably operated automatically and randomly by the gaming device or may be operated by the player. As to the preferred embodiment, the outcome of the pinball-type game is not dependent on player's skill.

The gaming device may also comprise a bonus wheel or reel for increasing the score resulting from play of the pinball-type game and/or from the play of the primary gaming unit. The bonus wheel or reel can be caused to spin automatically or in response to some outcome on either the gaming unit or pinball type game.

As described in more detail below, it is within the scope of the present invention to provide a payout from the primary gaming unit only, a payout from the pinball-type game only (with or without use of a bonus wheel), and a payout from the primary gaming unit and the pinball-type game (with or without use of a bonus wheel).

According to one embodiment of the present invention, when the reels of the primary gaming unit stop on one of a predetermined plurality of winning indicia sets, the pinball-type game is placed in an active state. A person, such as the player, may actuate a pinball plunger in order to operate the pinball-type game or the pinball can be actuated automatically. According to another embodiment of the present invention, activation of play of the pinball-type game requires operator intervention so that a player must involve a casino attendant.

Still other embodiments of the present invention comprise gaming devices having electronic means for displaying indicia of rotatable reels such as a video screen, and/or means for displaying a pinball-type game such as a video screen.

The present invention also comprises methods for playing wagering games of chance. One preferred method comprises the steps of providing a player with an opportunity to place a wager, providing a gaming unit for displaying a randomly selected combination of indicia, said displayed indicia selected from the group consisting of reels, indicia of reels, indicia of playing cards, and combination thereof, providing a pinball-type game operatively connected to the gaming unit, activating said pinball-type game, and providing at least one payout based solely on the outcome of the pinball-type game.

According to the present invention, it is also within the scope of the invention to provide a gaming device having a pinball- type game which provides a payout based solely on an outcome of the pinball-type game, and also a separate payout according to the embodiments of the parent application, e.g., embodiments having a payout indicator comprising a multiplier and a value indicator, wherein a payout is indicated to a player as the product of the value shown by the value indicator and the multiplier. According to the preferred embodiments of the parent application, the value of the multiplier is determined through the operation of a pinball-type game and a rotating bonus wheel or reel before determination of the value indicator, e.g., a rotating reel. The wheel and/or reel can be caused to spin automatically or in response to some action by a player, e.g., the player pushing a button. The value indicator may be electromechanically operated and linked to a random number generator which determines where the value indicator actually stops.

DETAILED DESCRIPTION

Figure 4:
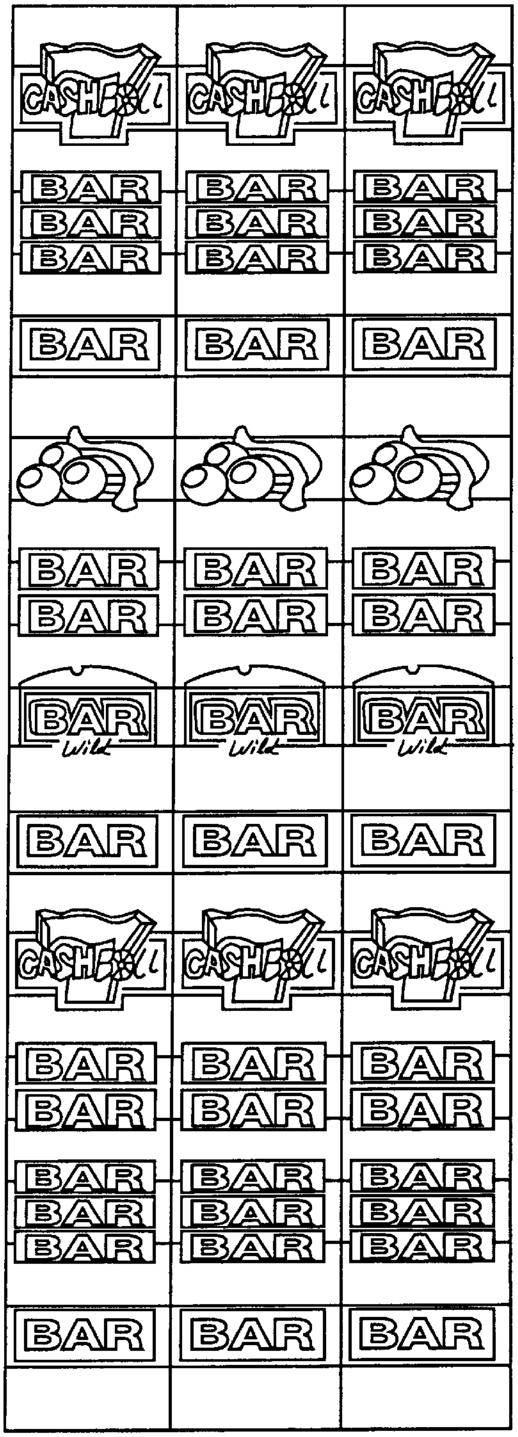
FIG. 4 illustrates the indicia utilized with the main reels shown in FIG. 3.
Figure 5:
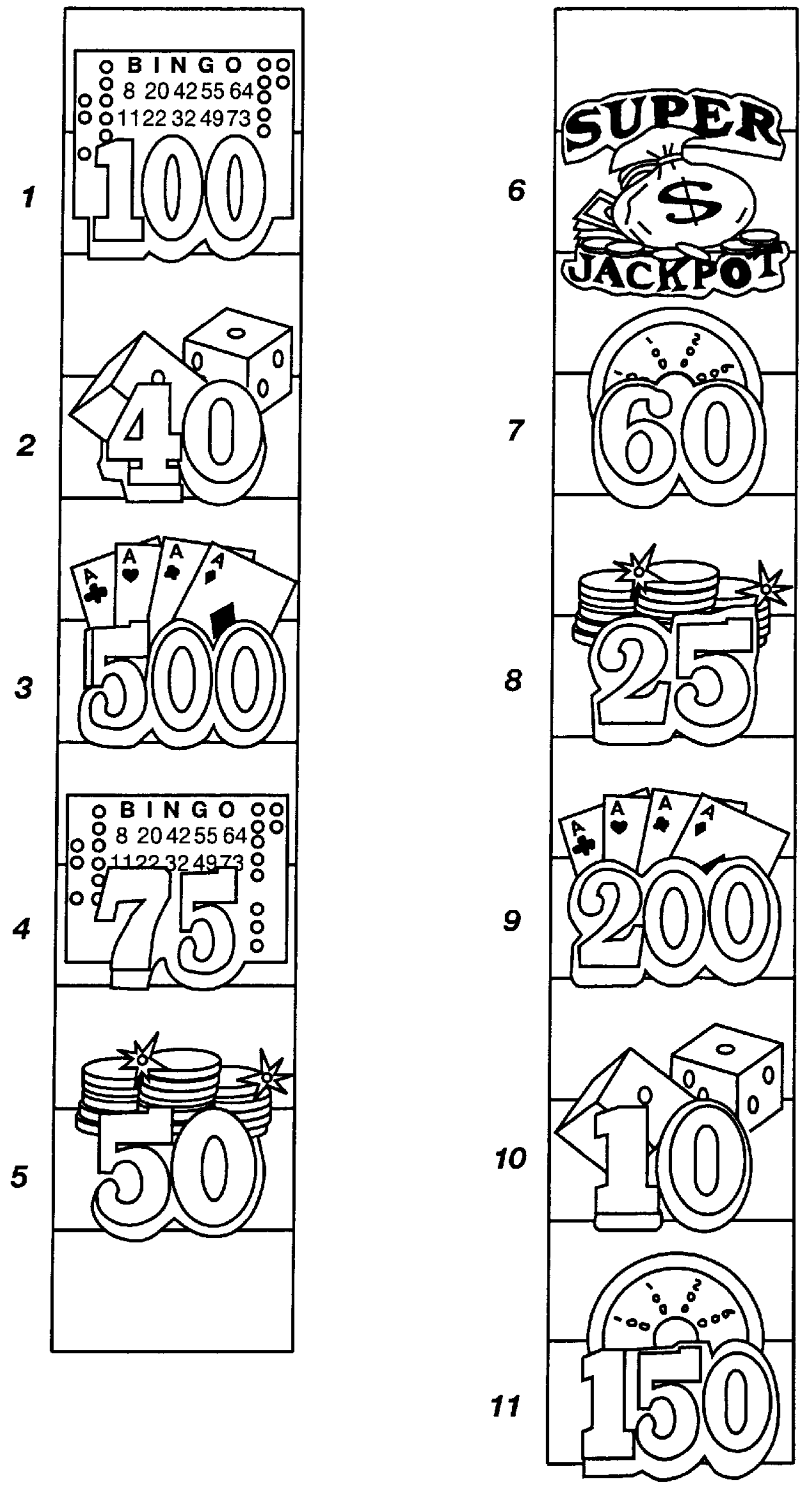
FIG. 5 illustrates the indicia of the fourth reel shown in FIG. 3.

The various embodiments of the present invention are designed to provide added excitement to a gaming device in order to increase the enjoyment to players and to serve as an added attraction to potential players. One preferred embodiment of the present invention, illustrated in FIGS. 1–5, comprises a gaming device 10 (FIG. 1) comprising a primary gaming unit 12 with three rotatable reels 11, each of which comprise a plurality of indicia (FIG. 4) on the periphery thereof, and a pinball-type game 50 (best shown in FIG. 2).

Figure 1:
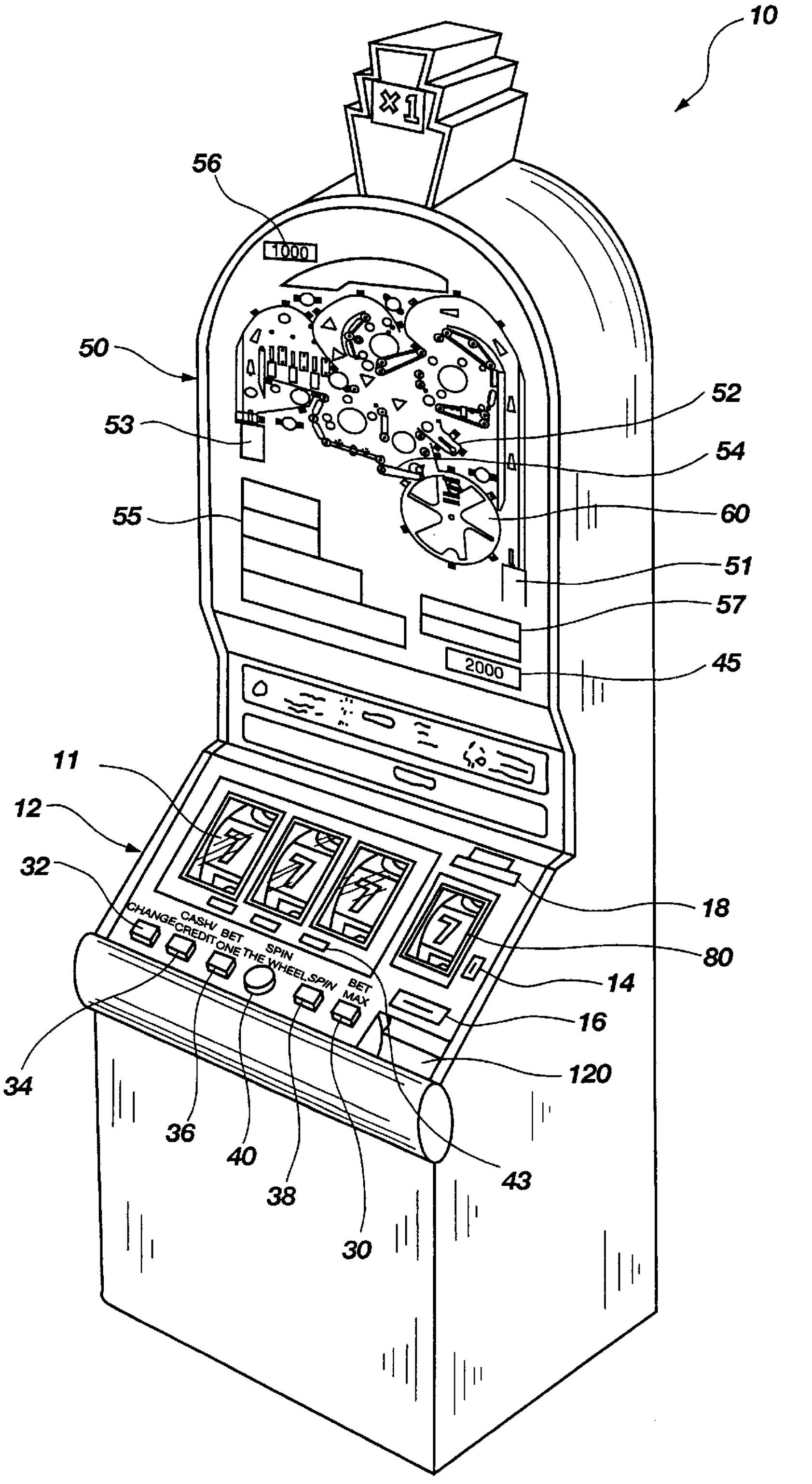
FIG. 1 is a perspective view of a gaming device of one embodiment of the present invention.

As shown in FIG. 1, this illustrated gaming device comprises a coin slot 14, currency validator 16 and a credit card validator 18. In a manner which will be recognized by those skilled in the art, each reel 11 is designed to rotate and then stop in order to visually display at least one, and preferably a number of indicia. Suitable player controls include a CHANGE button 32, a CASH/CREDIT button 34, a BET ONE button 36, and a BET MAX button 30.

If the collection of indicia displayed by reels 11 is one of a predetermined plurality of winning indicia sets, then the player can typically be provided with a winning payout either through coin chute 20 which deposits winnings into a coin trough or by increasing the player's credits in a credit window 43.

According to one aspect of the present invention, when reels 11 display a particular indicia set then pinball-type game 50 is activated and the player is provided with an opportunity for a payout based solely on pinball-type game 50. For example, primary gaming unit 12 may generate a signal in response to a particular indicia set to activate pinball-type game 50. Activation of pinball-type game 50 may also be in response to the amount wagered for play of primary gaming unit 50, e.g., a predetermined number of coins or credits, the players rate of play, a certain duration of continuous play by a player, the use of a player tracking device by a player, some other player influenced game criteria or some other signal generated by the gaming establishment which generates a signal to activate pinball-type game 50.

Figure 2:
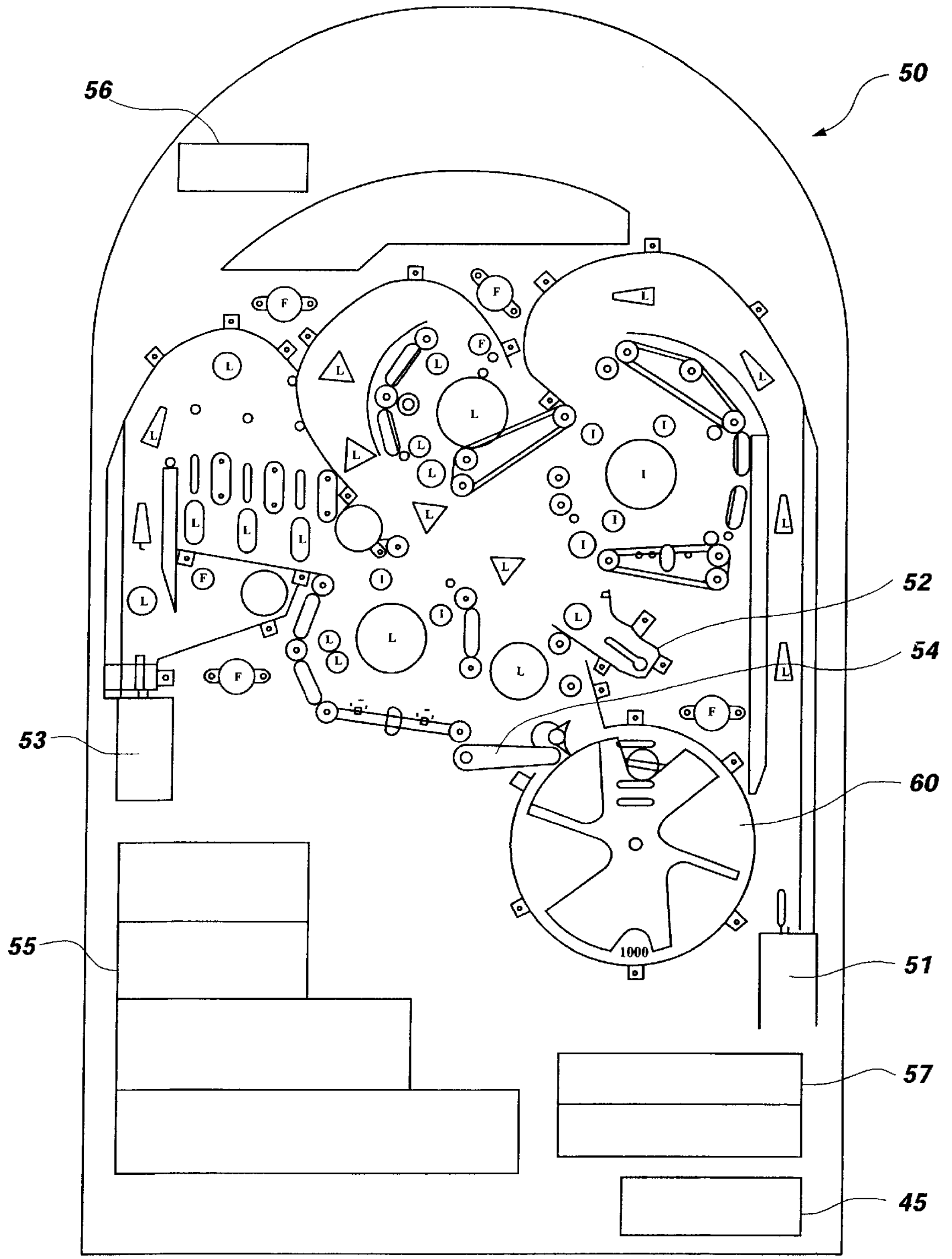
FIG. 2 is an enlarged, front elevational view of the pinball-type game of the embodiment of the present invention shown in FIG. 1.
Figure 3:
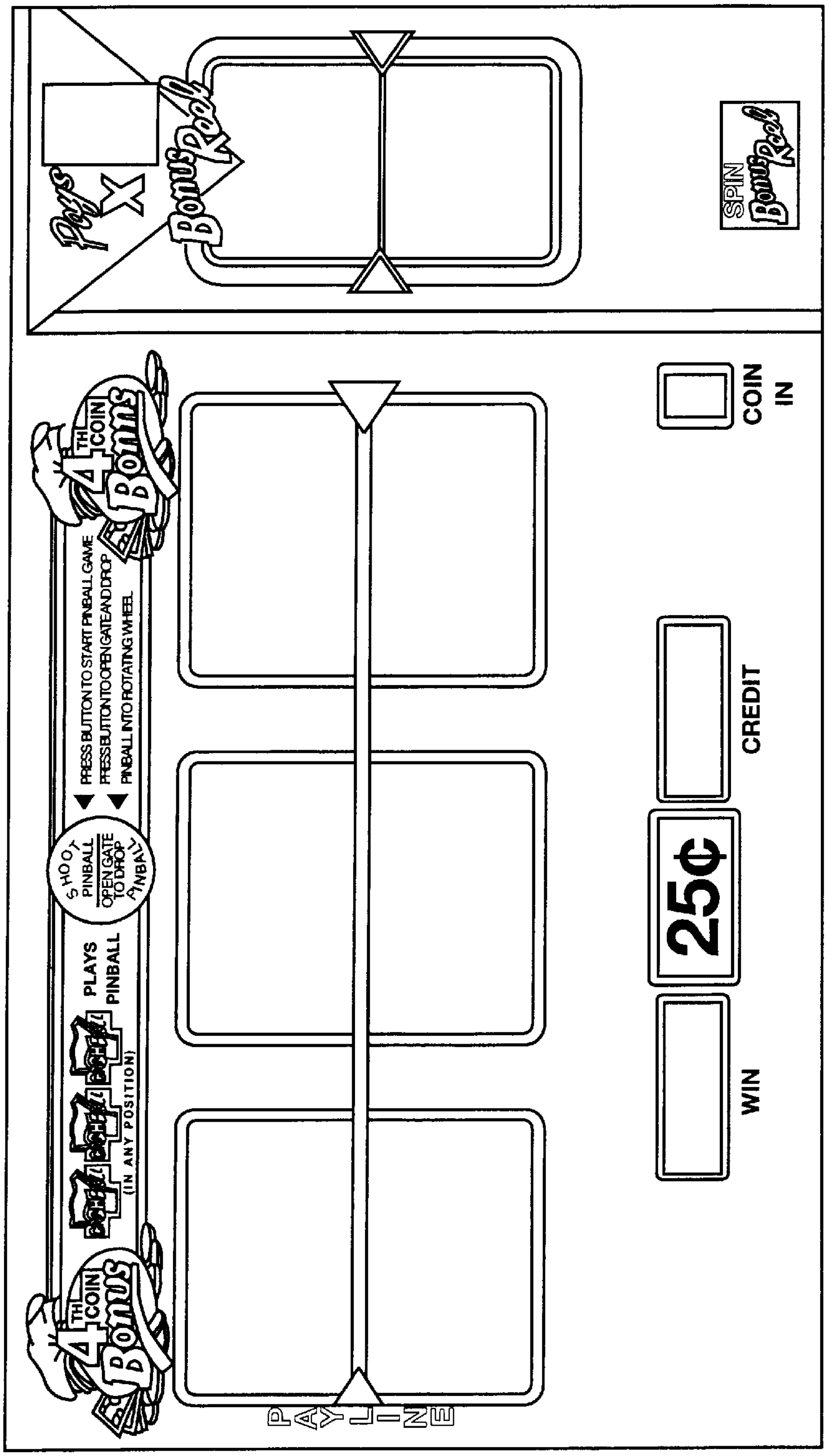
FIG. 3 is a view of the reel area of the primary gaming unit of the present invention shown in FIG. 1.

Upon activation, as best shown in FIG. 2, a pinball is placed onto a launcher 51 and the player is given a set amount of time, e.g., five seconds, to activate launcher 51, e.g., a spin/plunger actuate button 38, or launcher 51 is activated automatically. In the illustrated embodiment, a launcher sends the ball into the substantially vertical pinball-style field of bumpers and targets. The pinball bounces around and accumulates points which are indicated in point window 56 located in the upper portion of pinball-type game 50. Alternatively, a pinball can be simply released into a playing field which may or may not comprise bumpers for driving or ricocheting the ball around the field.

In this illustrated embodiment, after the ball traverses a first portion of the pinball field, the ball is ejected from a second plunger 52 and then subsequently from a third plunger 53. The illustrated embodiment also comprises an actual flipper 54 which is preferably automatically and randomly operated, or may be controlled by the player by activating a button. The player may be provided with one or more turns with a ball passing through the pinball-style field.

According to one embodiment, the total number of points from the pinball type game 50 may then be translated into a given multiplier which is then multiplied by the outcome of the primary gaming unit or by the outcome of a secondary wheel or reel. Alternatively, on the player's last ball, the ball is positioned above a rotatable bonus wheel 60. Bonus wheel 60 comprises a plurality of segments which bear designated different bonus values. A bonus value is then added to the points already accumulated in point window 56 during play of pinball-type game 50. The total point value in window 56 is then converted to a payout in accordance with payout schedule 57.

According to another embodiment of the present invention, when the reels display an indicia set which will provide play of the pinball-type game, activation of the pinball-type game requires intervention by a house attendant, such as a casino attendant. According to this embodiment of the present invention, the casino is provided with greater control over the payout of the pinball-type game and, if desired, can accompany the payout with great fanfare. It will be appreciated that the amounts of the payout indicated in the figures are merely for purposes of illustration and, if desired, the amounts can have a significantly greater value. For example, one of the areas on the payout schedule may correspond to a new automobile, a luxury vacation or a very large sum of money.

It is also within the scope of the present invention to provide a gaming device comprising a pinball-type game with non-monetary prizes or losing spaces wherein no additional prize is provided. In addition, it may be possible to provide the pinball-type game which affects the prize normally associated with the indicia shown on the primary gaming unit reels, e.g., increases or decreases the payment of the primary gaming unit.

Another embodiment of the present invention comprises providing gaming device having a pinball-type game which provides a payout based solely on the pinball-type game, and also a separate payout according to a payout indicator comprising two components. With reference to FIG. 1, the first component comprises pinball-type game 50 and the second component comprises a fourth reel 80. Pinball-type game 50 provides a multiplier which can increase the value indicated on fourth reel 80 by any desired amount, e.g., 1x, 2x, and 3x. In this illustrated embodiment, the multiplier is determined prior to the spinning of the fourth reel.

Pinball-type game 50 operates as explained above, and desirably, on the player's last ball, the ball is positioned above bonus wheel 60 for providing a bonus value. The total number of points from play of pinball-type game 50 is then converted to a multiplier as explained below.

In this illustrated embodiment, the value of the multiplier is determined by the outcome of pinball-type game 50. The possible scores that can be achieved from the pinball game are preferably listed on a payout schedule 55 in ranges with each attained range corresponding with a multiplier value, e.g., 1x, 2x, 3x, etc. For example, scores between zero and 9,999 are assigned a multiplier value of one (1x), scores from 10,000 to 19,999 are assigned a multiplier value of two (2x) and scores from 20,000 and up get a multiplier of three times (3x).

After the multiplier value, e.g., 1x, 2x or 3x, has been determined, that value is preferably displayed through a window 45 disposed above fourth reel 80. The fourth reel is then rotated and, upon stopping, indicates a base payout which is then multiplied by the multiplier and the resulting product value is awarded to the player. The player's payout can be credited to a credit meter or can be actually provided through a coin trough.

While the first component in the illustrated multiplier of the present invention in FIG. 1 is generally in the form of a pinball-type game, other randomly-controlled visible, mechanical indicia can be provided, whether controlled totally mechanically, electro-mechanically, or electronically, or any combination thereof.

When the various embodiments of the gaming device are not in use, the pinball-type game, the rotatable wheel, and/or the fourth reel can be set to an attract mode wherein a message is displayed to potential players and/or play is simulated.

Other preferred embodiments of the present invention comprise electronic gaming devices comprising a video screen or an LED display comprising an electronically generated image, e.g., a visual video display of a pinball-type game and a video display of three reels with a fourth bonus reel. While separate screens are preferred, both the reels and the pinball game indicator may be displayed on the same video screen.

The illustrated embodiment of the present invention is considered mnost preferable since it is believed that players prefer to see actual slot reels and an actual pinball-type game in a gaming device. Other, less preferred embodiments are also possible while providing some of the advantages of the present invention. Specifically, it is feasible to replace the spinning reels with other forms of standard gaming units, for example, a visible indicia of reels or indicia of playing cards, shown for example on a video screen. It is also possible to replace the rotatable wheel with some other discernible indicia of a mechanical bonus indicator.

What is claimed is:

1. A gaming device comprising:

a gaming unit for displaying a randomly selected combination of indicia;

a wager receiving component configured to receive at least one wager;

a randomly controlled pinball-type game operatively connected to said gaming unit, said pinball-type game configured to determine at least one pinball-type game outcome;

a multiplier generator in communication with said pinball-type game, said multiplier generator configured to generate a coefficient for use as a multiplier for altering at least one winning outcome displayable on said gaming device;

an activation component configured to activate said pinball-type game; and a payout component responsive to said outcome of said pinball-type game.

2. The gaming device according to claim 1 further comprising a signal generation component for generating at least one signal corresponding to at least one predetermined display of indicia by said gaming unit, and wherein said activation component is responsive to said at least one signal.

3. The gaming device according to claim 2 further comprising a value indicator in communication with said multiplier generator.

4. The gaming device according to claim 1 wherein said activation component is configured to be activated in response to at least one predetermined wager.

5. The gaming device according to claim 1 wherein said activation component is configured to be activated in response to a player's rate of play.

6. The gaming device according to claim 1 wherein the activation component is configured to be activated in response to a predetermined duration of continuous play.

7. The gaming device according to claim 1 wherein said activation component is configured to be activated in response to a signal received from the gaming establishment which is transmitted to said gaming device.

8. The gaming device according to claim 1 wherein said activation component is configured to be activated in response to use of a player tracking device.

9. The gaming device according to claim 8 wherein said at least one flipper is controlled by said gaming device to provide a random outcome to said pinball-type game.

10. The gaming device according to claim 1 wherein said pinball-type game comprises at least one flipper.

11. The gaming device according to claim 10 wherein said at least one flipper is controlled by a player.

12. The gaming device according to claim 1 wherein said gaming unit comprises indicia of reels.

13. The gaming device according to claim 1 wherein said gaming unit comprises three reels.

14. The gaming device according to claim 1 wherein said gaming unit comprises indicia of playing cards.

15. The gaming device according to claim 1 wherein said pinball-type game comprises a plurality of recesses into which a pinball may drop.

16. The gaming device according to claim 15 wherein said pinball-type game comprises a launching component configured to allow a player to control the drop of said pinball.

17. The gaming device according to claim 1 wherein said pinball-type game comprises a plurality of bumpers and at least one flipper automatically controlled by said gaming device for randomly controlling a path of a pinball.

18. The gaming device according to claim 1 wherein said gaming unit comprises a video screen.

19. The gaming device according to claim 1 wherein said pinball-type game comprises a substantially vertical play field.

20. The gaming device according to claim 1 wherein said pinball-type game further comprises a bonus wheel configured to alter the at least one pinball-type game outcome.

21. The gaming device according to claim 20 wherein said bonus wheel is rotatable.

22. The gaming device according to claim 1 wherein said payout component comprises an audio speaker.

23. The gaming device according to claim 1 further comprising a payout indicator responsive to said activation component, said payout indicator comprising a value indicator and a multiplier display.

24. The gaming device according to claim 23 wherein said value indicator is a reel.

25. The gaming device according to claim 23 wherein said multiplier generator is configured to be activated by said activation component in response to said pinball-type game outcome.

26. The gaming device according to claim 1 further comprising a display portion configured to display said coefficient.

27. A method of conducting a wagering game of chance comprising:

providing a player with an opportunity to place a wager;

providing a gaming unit for displaying a randomly selected combination of indicia, said displayed indicia selected from the group consisting of reels, indicia of reels, indicia of playing cards, and a combination thereof;

providing a pinball-type game operatively connected to said gaming unit;

activating said pinball-type game;

obtaining an outcome from play of said pinball-type game; and providing at least one payout as a multiplication product derived from the outcome of said pinball-type game.

28. The method of conducting a wagering game of chance according to claim 27 further comprising generating at least one signal corresponding to at least one predetermined display of indicia by said gaming unit and wherein the activating of said pinball-type game is in response to said at least one signal.

29. The method of conducting a wagering game of chance according to claim 27 wherein said activating said pinball-type game comprises enabling initiation of play of said pinball-type game in response to a predetermined wager.

30. The method of conducting a wagering game of chance according to claim 27 wherein said activating said pinball-type game is in response to a player's rate of play.

31. The method of conducting a wagering game of chance according to claim 27 wherein said activating said pinball-type game is in response to a predetermined duration of continuous play.

32. The method of conducting a wagering game of chance according to claim 27 wherein said activating said pinball-type game is in response to a signal received from the gaming establishment which is transmitted to said gaming device.

33. The method of conducting a wagering game of chance according to claim 27 wherein said activating said pinball-type game is in response to use of a player tracking device.

34. The method of conducting a wagering game of chance according to claim 27 wherein providing said pinball-type game comprises providing a bonus wheel for altering the outcome of the pinball-type game.

35. The method of conducting a wagering game of chance according to claim 27 wherein said displaying comprises displaying a plurality of reels.

36. The method of conducting a wagering game of chance according to claim 27 further comprising providing a payout indicator operatively connected to said gaming unit.

37. The method of conducting a wagering game of chance according to claim 36 wherein providing said payout indicator comprises providing a value indicator and a multiplier display.

38. The method of conducting a wagering game of chance according to claim 37 wherein said payout indicator comprises a reel.

39. The method of conducting a wagering game of chance according to claim 37 wherein said multiplier display is responsive to the outcome of said pinball-type game.

40. The method of conducting a wagering game of chance according to claim 37 wherein said payout indicator comprises a bonus wheel.

41. The method of conducting a wagering game of chance according to claim 27 wherein the outcome of said pinball-type game is randomly determined.

42. A gaming device comprising:

a gaming unit for displaying a randomly selected combination of indicia, said displayed indicia selected from the group consisting of reels, indicia of reels, indicia of playing cards, and combinations thereof;

means for receiving at least one wager;

a randomly controlled multiplier operatively connected to said gaming unit;

a randomly controlled pinball-type game operatively connected to said gaming unit;

means for activating said pinball-type game; and means for providing a payout responsive to at least one of said gaming unit, said randomly controlled multiplier or said pinball-type game.

* * * * *